United States Patent

Carrier et al.

[11] Patent Number: 5,535,524
[45] Date of Patent: Jul. 16, 1996

[54] VIBRATION DAMPER FOR COORDINATE MEASURING MACHINE

[75] Inventors: Paul W. Carrier, Smithfield; Richard A. MacManus, Narragansett, both of R.I.

[73] Assignee: Brown & Sharpe Manufacturing Company, North Kingston, R.I.

[21] Appl. No.: 379,882

[22] Filed: Jan. 27, 1995

[51] Int. Cl.$^6$ ............................................. G01B 21/04
[52] U.S. Cl. ............................................ 33/503; 33/1 M
[58] Field of Search ................ 33/1 M, 503, 504, 33/505, 556, 559, 572; 248/636

[56] References Cited

U.S. PATENT DOCUMENTS

| | | | |
|---|---|---|---|
| 4,133,112 | 1/1979 | Matthiessen | 33/1 M |
| 4,282,938 | 8/1981 | Minamidate . | |
| 4,389,781 | 6/1983 | Donaldson | 33/503 |
| 4,594,791 | 6/1986 | Brandstetter | 33/503 |
| 4,595,166 | 6/1986 | Kurokawa . | |
| 4,635,892 | 1/1987 | Baker . | |
| 4,682,418 | 7/1987 | Tuss et al. . | |
| 4,697,781 | 10/1987 | Hamano et al. . | |
| 4,706,788 | 11/1987 | Inman et al. . | |
| 4,716,656 | 1/1988 | Maddock et al. . | |
| 4,722,946 | 2/1988 | Hostettler . | |
| 4,798,006 | 1/1989 | Barnaby | 33/503 |
| 4,799,316 | 1/1989 | Tuss | 33/503 |
| 4,879,906 | 11/1989 | Meline et al. . | |
| 4,958,437 | 9/1990 | Helms | 33/1 M |
| 4,964,221 | 10/1990 | Breyer et al. | 33/504 |
| 5,042,162 | 8/1991 | Helms | 33/503 |
| 5,086,564 | 2/1992 | Schalz | 33/1 M |

FOREIGN PATENT DOCUMENTS

| | | | |
|---|---|---|---|
| 0140079 | 2/1980 | German Dem. Rep. . | |
| WO91/03707 | 3/1991 | WIPO | 33/503 |

OTHER PUBLICATIONS

Harris and Crede, "Shock and Vibration Handbook", 2d Ed. 1976.
Statement of Paul W. Carrier Pursuant to Applicants' Duty of Disclosure Under 37 C.F.R. §1.56.

*Primary Examiner*—William A. Cuchlinski, Jr.
*Assistant Examiner*—G. Bradley Bennett
*Attorney, Agent, or Firm*—Wolf, Greenfield & Sacks

[57] ABSTRACT

A coordinate measuring machine has a single vertical column mounted to a horizontal table for moving in the x-direction, and a carriage mounted on the column for vertical movement in the z-direction. The column is moved with a motor that drives a rack and pinion. The carriage supports a y-rail that moves in the y-direction. A first damper is positioned over the z-rail in the -y direction so that the column is intermediate the damper and the probe. A second damper is positioned at an end of the y-rail near the probe. The dampers reduce both large amplitude transients, as well as steady-state vibrations that are caused by the motor cogging and gearing between the motor and the rack and pinion.

15 Claims, 6 Drawing Sheets

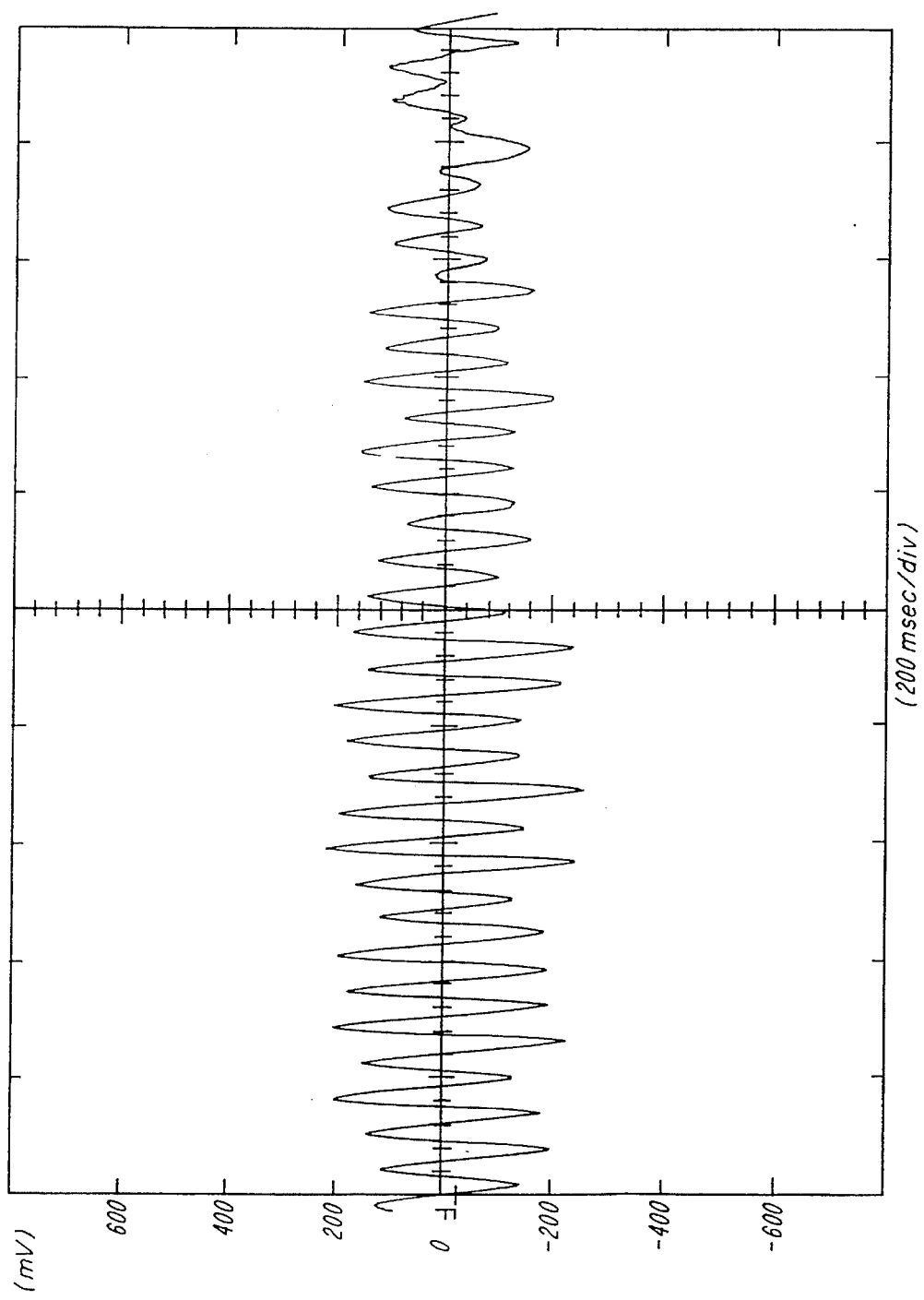

VIBRATION DAMPER FOR COORDINATE MEASURING MACHINE

FIELD OF THE INVENTION

This invention relates to coordinate measuring machines.

BACKGROUND OF THE INVENTION

Coordinate measuring machines (CMM's) are high precision machines that are used to measure objects, such as automobile body parts. The CMM tests the object to make sure that it has a correct, desired shape and size within a defined tolerance that can be as little as several ten-thousandths of an inch. Typical CMM's have three motor-driven rails, each of which is movable under computer control along one of three mutually orthogonal axes. A probe is positioned at the end of one of the rails. The probe is quickly moved to a position near the object, is brought to a stop, and then is moved slowly at a near constant velocity until it touches the object, called "making a hit". Thus, the rails, and hence the probe, are accelerated and decelerated before being again brought to a low velocity to make the hit.

One type of CMM that is currently available has a horizontal table on which the object is mounted and a single vertical column mounted at a side of the table. A motor-driven drive assembly moves the column along a side of the table in a direction defined as the x-axis. A carriage is mounted on the vertical column, and moves vertically in a direction perpendicular to the table and defined as the z-axis. The carriage has a motor for moving a horizontal rail over the table along the y-axis. The carriage may be moved along a column, where the column is vertically fixed, or the carriage may be mounted on top of the column while the column itself is raised and lowered by a motor.

When the rails of the CMM are moved, and especially when they are stopped and started, vibrations occur. To ensure accuracy in the measurement, these vibrations need to be sufficiently attenuated before making a measurement. While this attenuation can be accomplished simply by waiting for the vibrations to dampen, such an approach greatly reduces the throughput of measurement.

In U.S. Pat. Nos. 5,042,162 and 4,958,437, which are hereby incorporated by reference, a gantry-type CMM is shown and described. In such a CMM, an inverted U-shaped gantry moves along a horizontal table, driven by a motor that is positioned at one side of the table. Those patents describe in detail torques, and hence sources of vibration, that are experienced by a gantry-type CMM, as well as a type of vibration damper that increases throughput by damping vibrations, thus allowing measurements to be taken more quickly in succession. In the CMM described in those patents, one damper is positioned on the gantry, one damper is positioned on a vertical z-rail that has a probe, and one is positioned under the table. The damper that is on the gantry is positioned as far as possible away from the x-rail drive both in the vertical and horizontal directions. In this CMM, the rails are driven with a motor and a multiple v-belt, which runs smoothly and has little vibration.

SUMMARY OF THE INVENTION

The present invention features an apparatus and a method for reducing vibrations in a CMM, and for increasing both throughput and accuracy of measurement. Vibration dampers are positioned so that they reduce both large amplitude transient vibrations that occur due to acceleration and deceleration, and also smaller steady-state vibrations that occur due to the use of a drive assembly that includes a motor and rack and pinion gear arrangement, even under constant velocity. Such steady-state vibrations, which are mainly due to the effects of motor cogging and also bearing runout, gear tooth engagement, and timing belt cogging, have a sinusoidal waveform superimposed over the large amplitude transient. Depending on when the measurement is taken, the steady-state vibration can cause the measurement to be inaccurate by an amount that is significant compared to a defined tolerance for measuring the object.

According to the present invention, a CMM has a vertical column which serves as a z-rail and is mounted at its base adjacent the horizontal table. The z-rail can either be itself vertically movable, or can have a carriage that moves vertically along the column. The carriage houses a drive assembly that includes a motor and a rack and pinion gear assembly for extending a y-rail horizontally over the table. The probe is mounted at the end of the y-rail. For reference, the y-direction is defined herein as extending horizontally over the table so that y=0 at the center of the column, and so that the probe is always at a position greater than zero (it should be noted that the software that controls the CMM may define the plane y=0 differently, but it is defined in such a manner here only for reference).

A first vibration damper is positioned over the z-rail and is positioned to be in the -y direction so that in the y-direction, the column is intermediate the damper and the probe. The first damper includes a block of lead that has preferable dimensions of about 8×4×4.3 inches, and weighs about 60 lbs. A second vibration damper is positioned at the end of the y-rail adjacent the probe, and is a block of lead weighing about 4.5 lb. These blocks each rest on supports that are preferably polymer and are appropriately tuned. The damper is preferably about 4-8% of the total weight of the column, carriage, y-rail, and probe.

The present invention also includes a method for increasing throughput and accuracy of a CMM that includes appropriately positioning vibration dampers to reduce both large amplitude transient vibrations, as well as steady-state vibrations. The dampers are preferably positioned as discussed above, so that a first damper is mounted over the z-rail in the -y direction, and a second damper is at the end of the y-rail.

BRIEF DESCRIPTION OF THE DRAWINGS

Other features and advantages will become apparent from the following detailed description when read in conjunction with the drawings in which:

FIGS. 4-7 are graphs of test results illustrating vibrations with and without dampers.

DETAILED DESCRIPTION

Figure 1:
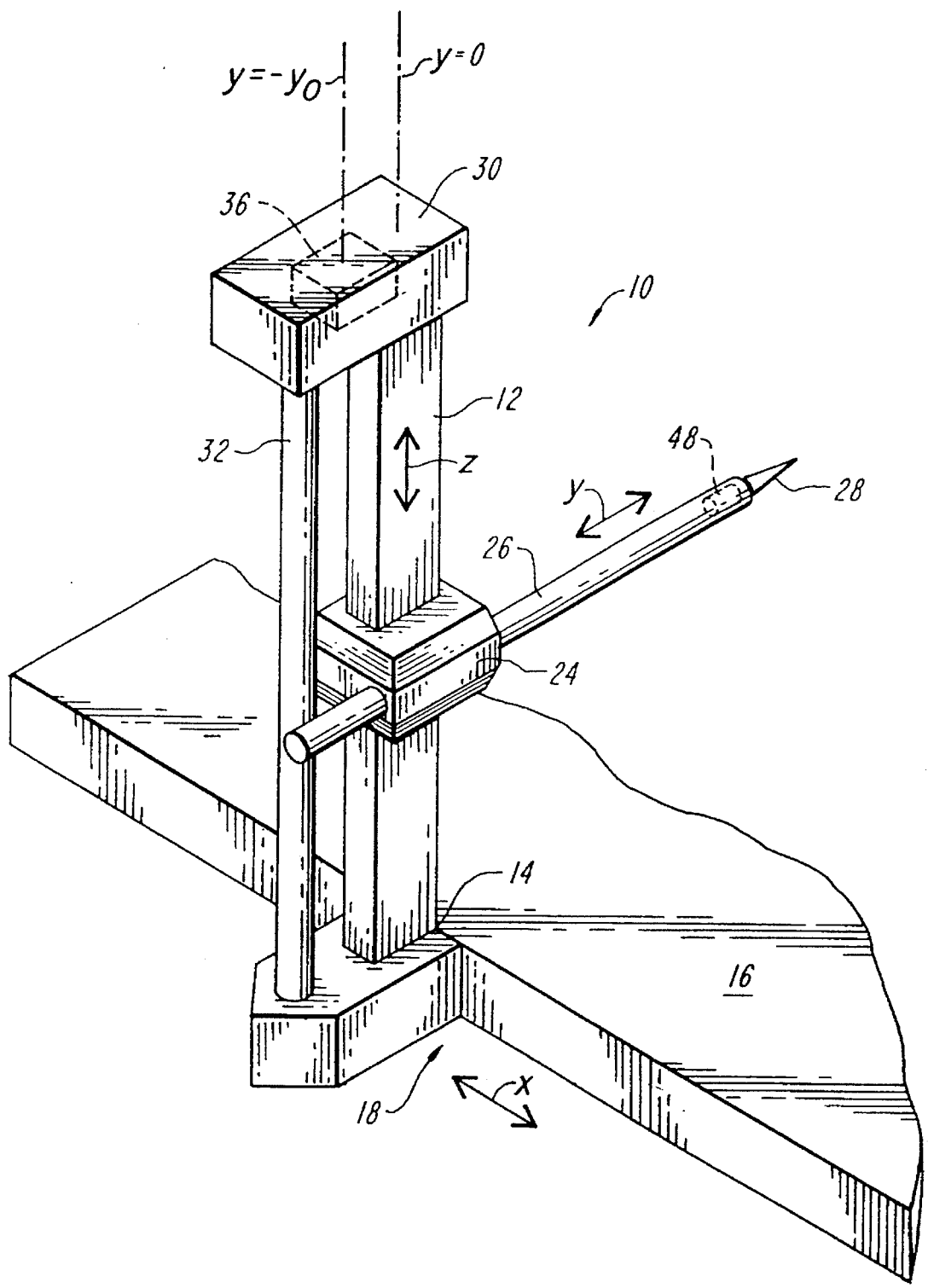
FIG. 1 is a perspective view of a CMM according to the present invention.

Referring to FIG. 1, in a first embodiment of the present invention, a CMM 10 has a single vertical column 12 that serves as a z-rail. Column 12 is mounted at its base 14 to a flat, horizontal table 16 on which an object to be measured (not shown) is clamped. Table 16 lies in the x-y plane with z=0. A first drive assembly 18 moves the column relative along the side of table 16 along an x-axis. Mounted on column 12 is a carriage 24 that is coupled to a second drive assembly (not shown) for vertical movement relative to the column. Carriage 24 also supports a y-rail 26 and houses a third drive assembly (not shown) that drives y-rail 26 over the table in the y-direction. The center of column 12 is defined here for reference as the location where y=0. Mounted at the end of the y-rail, a computer controlled probe 28 takes hits on the object. Each of the drive assemblies includes a motor and a rack and pinion gear assembly (not separately shown). A CMM of this general type is currently available from Mora Fabrik fuer Messgeraete h. Freund GmbH, a company incorporated in Germany, and is sold as part of an integrated system by the assignee of the present invention under the name "ORYZO". The Mora CMM has a small cover at the top of the z-rail coupling to a support beam and for enclosing a mechanical screw assembly that compensates for bending in the column.

Figure 2:
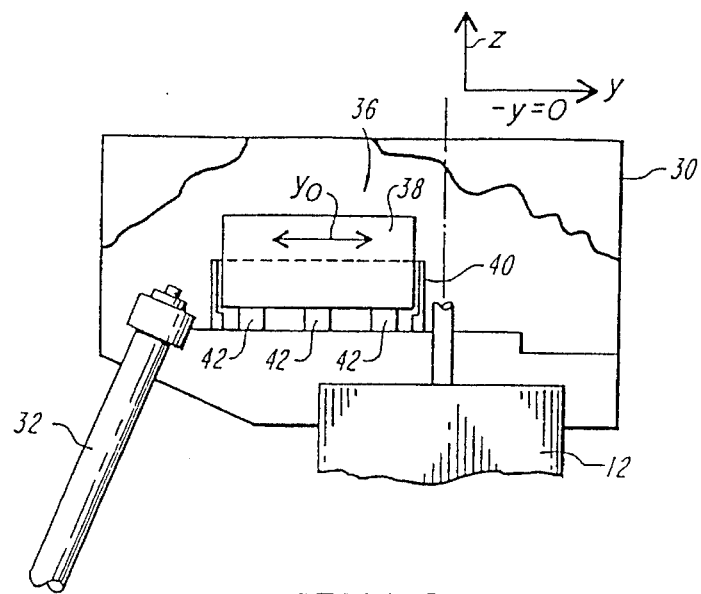
FIG. 2 is a close-up partially cut-away view of a portion of the CMM of FIG. 1.

Referring also to FIG. 2, in a CMM according to the present invention, the small cover and the mechanical screw assembly found in the Mora machine are discarded and replaced with a larger cover assembly 30 that is positioned over column 12 and houses a first vibration damper 36, and supports a connection to a support beam 32. First damper 36 is positioned over column 12 but to a side of column 12 so that first damper 36 is centered at a position $Y=-Y_0$, where $Y_0$ is preferably about 4.5 inches. Damper 36 includes a lead mass 38 that is roughly about 8×4×4.5 inches and weighs about 60 lbs. Mass 38 is mounted with a mounting bracket 40 and rests on six support pads 42 that are preferably made from a polymer, such as "AXIDYNE", a product that is available from Polymer Dynamics, Inc. Damper 36 is appropriately tuned to improve performance.

Column 12 is about 135 inches high from the top of the table to the support pads and weighs about 820 lb including carriage 24, y-rail 26, and probe 28. Accordingly, the $Y_0$ is about 3.3% of the height of column 12, and mass 38 is about 7.3% of the weight of column 12.

A second damper 48, which also has a mass mounted on supports (not separately shown) that are preferably made from a polymer, is positioned near the end of the y-rail adjacent the probe, and weighs about 4.5 lb.

It has been found that there are at least two different sources of vibration when this type of CMM is operated. A first source is the acceleration and deceleration of the x-rail when a motor for first drive assembly 18 stops and starts. Since y-rail 26 either extends over table 16 and has a center of mass in the positive y-direction, or is retracted so that the center of mass is in the negative y-direction, a bending and twisting movement is created in column 12, and a bending movement is created in y-rail 26. This first source causes vibration that has large amplitude transients that are damped by dampers 36, 48.

A second source of vibration is the drive assemblies, and particularly by the motors and rack and pinion gear assemblies that move the rails, and more particularly by the motor and rack and pinion in the first drive assembly 18. Such a source was not prominent in the prior gantry-type CMM's, since these CMM's had belts that are smoother than a rack and pinion with toothed gears. This second source of vibration occurs when column 12 is moving slowly at a near constant speed. At low speeds, motor cogging, gear tooth engagement, and timing belt cogging cannot be avoided. The problem becomes even greater when a frequency from drive assembly 18 is at or near a natural frequency of the structure of the CMM. This second source causes a generally sinusoidal vibration that is superimposed over the large amplitude transient vibrations caused by the first source.

Since the hit could be anywhere along the sinusoidal waveform, the measurement at the measuring point can vary significantly. If the sinusoid has a sufficient amplitude, the range of the amplitude can be significant compared to the desired tolerance of measurement for the object. By reducing the amplitude of this sinusoidal waveform, the measured points can be taken more quickly and are more accurate. From this second source, the vibrations cause torques that are similar to those caused by the first source, i.e., the acceleration of the rails.

As positioned according to the present invention, the dampers attenuate both sources of vibration. First damper 36 at the top of column 12 helps to attenuate vibrations in column 12. The positioning of second damper 48 at the end of y-rail 26 helps to dampen vibrations that occur due to twisting of column 12 when y-rail 26 is extended over table 16 and first drive assembly 18 accelerates or decelerates. If y-rail 26 is retracted, however, the twist occurs relative to a point that extends over the table 16 because the center of mass of y-rail 26 is now in the −y direction. In this case, the positioning of first damper 36 in the −y direction helps to dampen such twisting vibrations.

Figure 3:
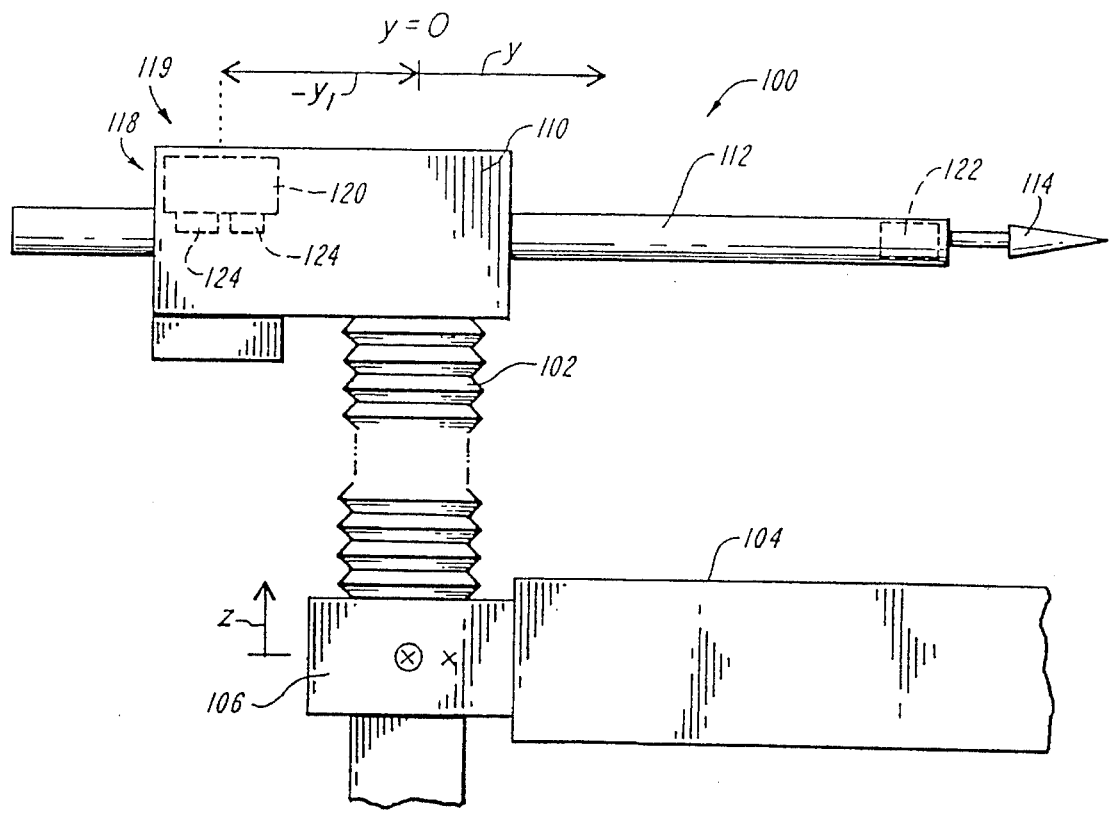
FIG. 3 is a side elevational view of another type of CMM according to the present invention.

Referring to FIG. 3, in another embodiment of the present invention, a CMM 100 has a vertical column 102 (z-rail) mounted to a horizontal table 104 and driven along the side of the table with a first drive assembly 106. In this embodiment, unlike the embodiment of FIG. 1, vertical column 102 has bellows and is itself driven in a direction perpendicular to the x-y plane of table 104 so that the position of carriage 118 and vertical column 102 are fixed relative to each other. A cover 110 is positioned at the top of the column for housing the gears for a y-rail 112. Like the embodiment of FIG. 1, a probe 114 is positioned at the end of the y-rail.

A first damper 118 is positioned just under the top of cover 114 and at the portion of cover 110 most remote from the probe, centered at a point where $y=-y_1$, where $Y_1$ is preferably about 16 inches. First damper 118 includes a mass 120 that is roughly about 6×7×3 inches and rests on eight supports that are preferably made from polymer. The supports rest on a shelf (not shown).

A second damper 122 is positioned at the end of y-rail 112 had dimensions of about 3.5×2×2 inches and weighs about 8.25 lbs.

The maximum height of column 102 is about 77.75 inches from table top to support pads 124, and the weight is about 750 lb. Thus $Y_1$ is about 20% of the height and the mass is about 4% of the weight of column 102.

Thus, this embodiment and the embodiment of FIG. 1 have generally similar placement of the dampers where one is at the end of the y-rail at a location near the probe, and the other is housed in a cover over the z-rail in a position in the −y direction. This type of CMM is available under the model name "SMPCR", and is available from the assignee of the present invention.

Figure 4:
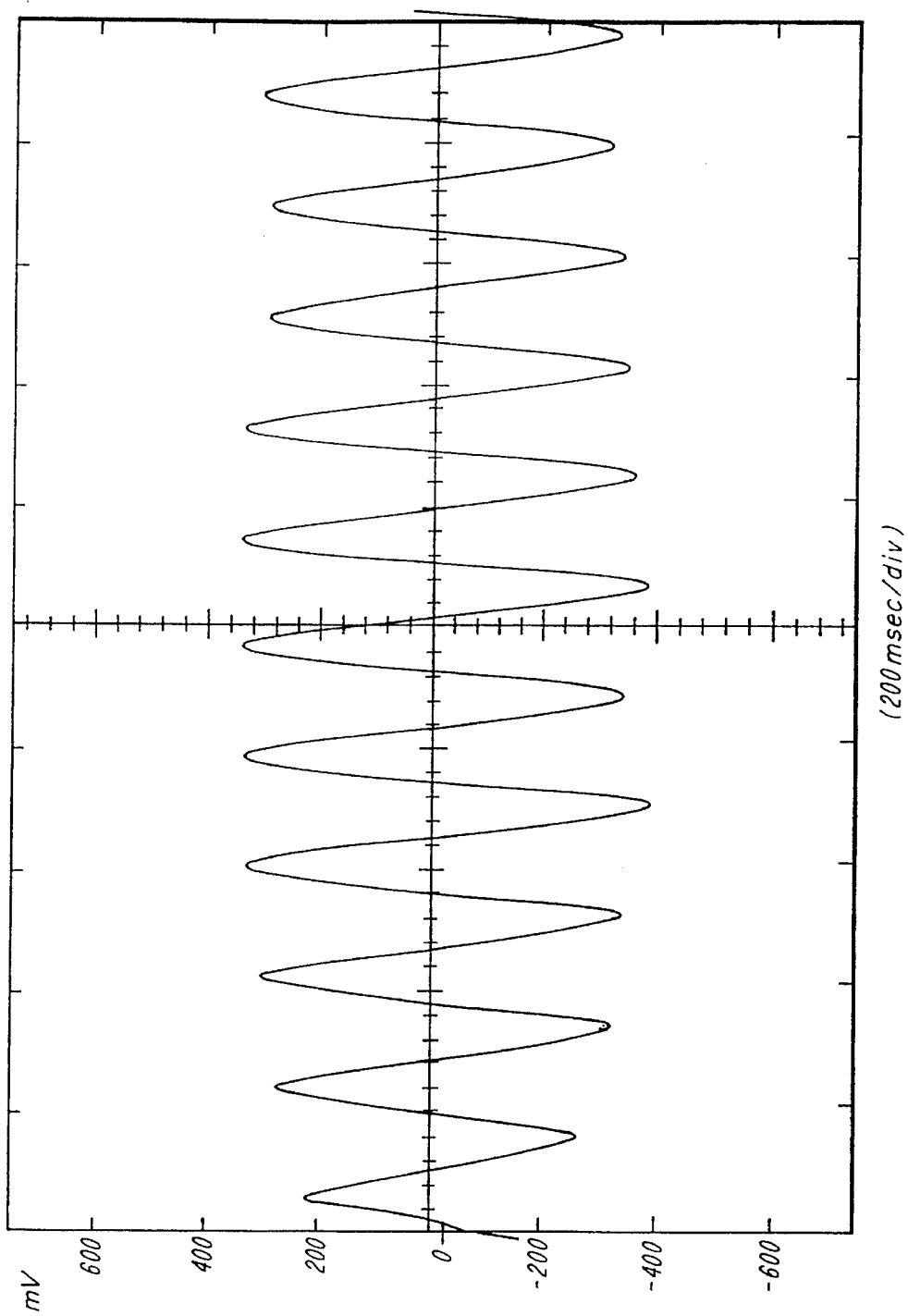
Figure 5:
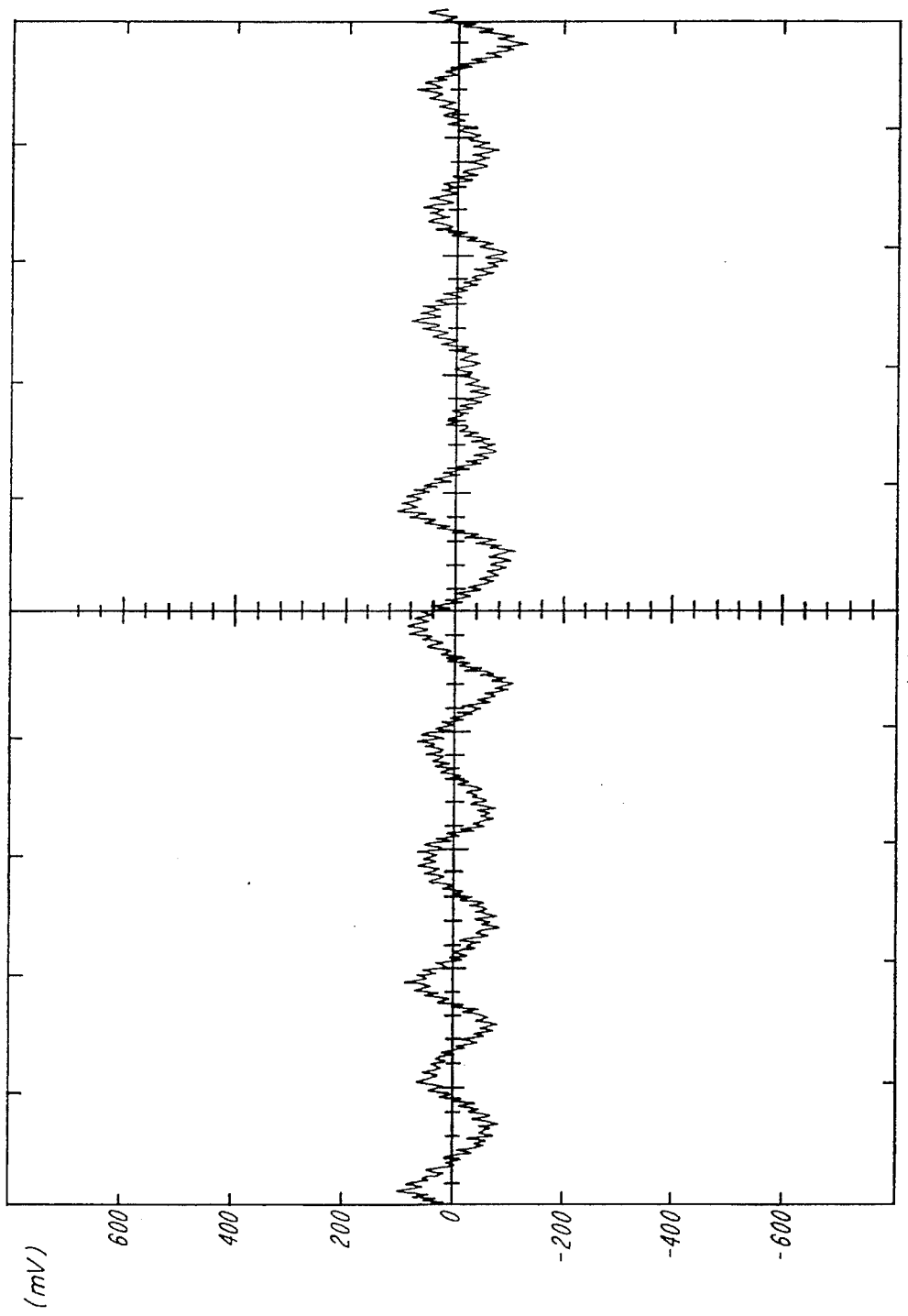

FIGS. 4–7 are graphs of sinusoidal vibrations for CMM's with and without vibration dampers positioned in accordance with the present invention. FIGS. 4 and 5 are graphs of measurements made on a CMM, such as that shown in the embodiment of FIG. 3, with a transducer on the y-rail where the y-rail is extended 80% outward over the table in the +y direction, the z-rail is extended about 80% of its maximum height, and the column is moving along the x-axis at a constant velocity of about 1% or 5 mm/sec. By moving the column constantly over a period of time, the first source of vibrations are eliminated because the transients have time to attenuate.

As is shown in FIG. 4, without vibration dampers the peak-to-peak voltage range of the vibration is about 736 millivolts at a frequency of about 5.6 Hz, which is about a resonant frequency of the CMM. As shown in FIG. 5, with vibration dampers, the voltage range is reduced to about 216 millivolts. Accordingly, the ratio of the voltage range without damping to the voltage range with damping is about 3.4. Since each division represents about 18 microns, the variation in measurement is reduced from a range of at least about 60 microns to less than 20 microns.

Figure 6:
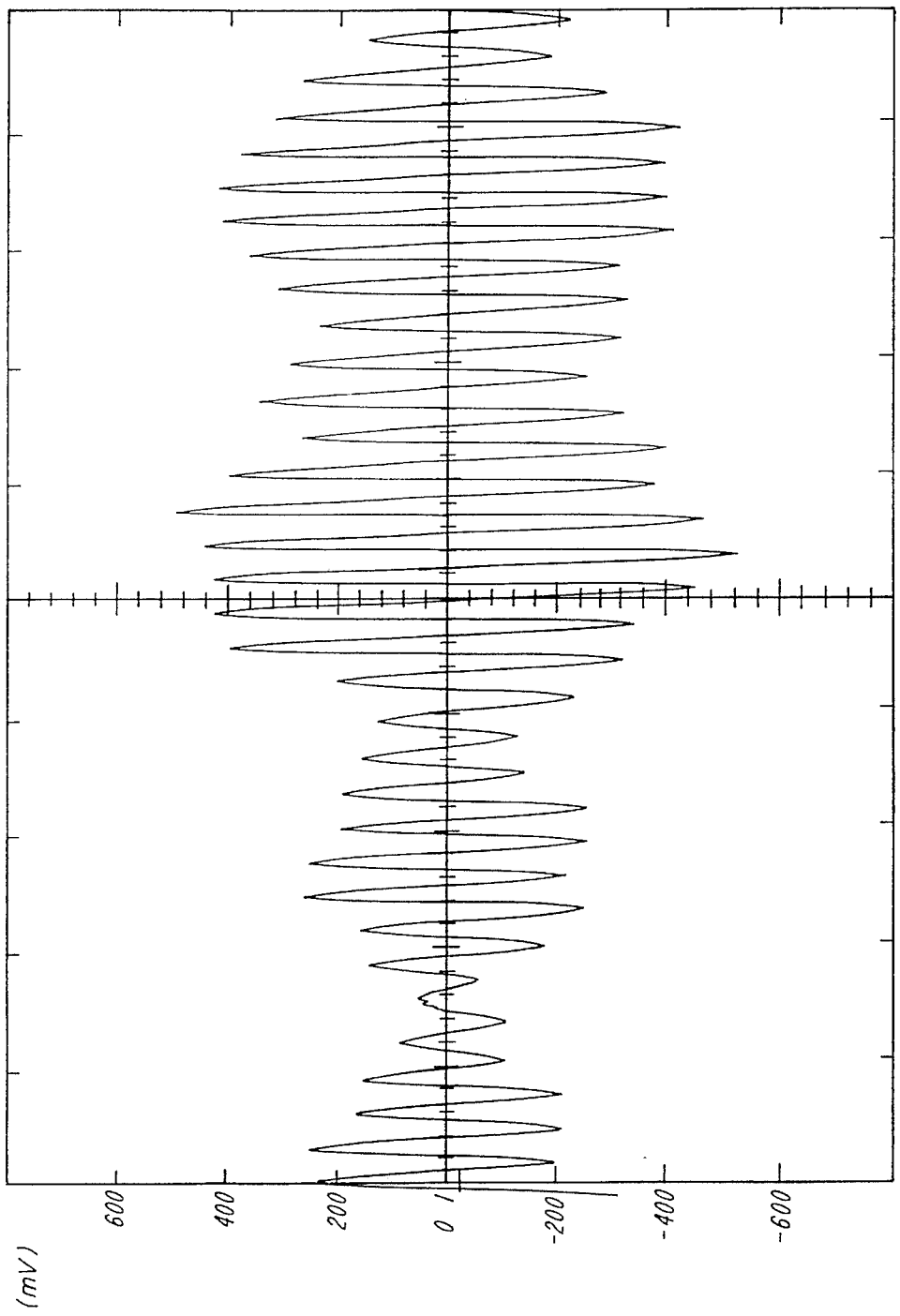

Referring to FIGS. 6 and 7, these measurements were taken without and with dampers, respectively, with a y-rail extended 80%, the z-rail near the base and a constant velocity of 3% or 15 mm/sec. As shown in the graphs, the peak-to-peak voltage is 1008 millivolts without dampers and 472 millivolts with dampers, for a ratio of 2.14. The improvement in the latter two figures is less than in the former two because the frequency was not as close to a machine resonance.

Accordingly, when a motor with a rack and pinion gear is used to move rails of a CMM, the steady-state sinusoidal vibration can be reduced a substantial amount by positioning a first vibration damper on the vertical column at a position in the −y direction, and a second vibrational damper on the y-rail near the probe. The vertically positioned damper also helps to remove vibrations due to the first source, thus improving throughput. By reducing the vibrations due to the second source, both the throughput and the accuracy of the measurement is improved.

What is claimed is:

1. A coordinate measuring machine comprising:

a generally horizontal table;

a generally vertical column coupled to the table for relative movement with respect to the table in a first direction;

a carriage disposed on the column, the carriage being movable in a second direction perpendicular to the table, the carriage supporting a rail that is movable in a third direction, wherein the first, second and third directions are mutually orthogonal;

a probe mounted on the rail; and a first vibration damper positioned over the column and positioned on a side of the column opposite of the probe so that the column is intermediate the damper and the probe in the third direction, the vibration damper reducing the amplitude of vibrations that occur when the column moves.

2. The coordinate measuring machine of claim 1, wherein the carriage moves along and relative to the column in the second direction, and wherein the column is stationary in the second direction.

3. The coordinate measuring machine of claim 1, wherein the carriage is mounted on top of the column, wherein the column moves in the second direction, and wherein the carriage is fixed relative to the column.

4. The coordinate measuring machine of claim 1, further including a second vibration damper mounted on the rail adjacent the probe.

5. The coordinate measuring machine of claim 2, further including a second vibration damper mounted on the rail adjacent the probe.

6. The coordinate measuring machine of claim 3, further including a second vibration damper mounted on the rail adjacent the probe.

7. The coordinate measuring machine of claim 1, wherein the damper includes a mass that rests on a set of supports, the mass weighing at least about 60 lbs.

8. The coordinate measuring machine of claim 7, wherein the supports comprise pads formed of a polymer.

9. The coordinate measuring machine of claim 4, wherein the second vibration damper includes a mass mounted on supports.

10. The coordinate measuring machine of claim 9, wherein the supports comprise pads formed of a polymer.

11. The coordinate measuring machine of claim 1, wherein the damper includes a mass, the center of the mass being at least about 4.5 inches from the center of the column in the second direction.

12. The coordinate measuring machine of claim 1, wherein the first damper includes a support and a mass resting on the support, the mass weighing about 4–8% of the weight of the column.

13. A method for improving accuracy and throughput of a coordinate measuring machine having a table, a column coupled to the table for relative movement of the column with respect to the table in a first direction, a carriage disposed on the column and being movable in a direction perpendicular to the table, the carriage supporting a rail that is movable in a third direction, wherein the first, second and third directions are mutually orthogonal, and a probe disposed on the rail, the method comprising the step of:

positioning a first vibration damper over the column on a side of the column opposite of the probe in the third direction so that the column is intermediate the damper and the probe in the third direction whereby the amplitude of steady-state vibrations is reduced when the probe is being moved relative to the table.

14. The method of claim 13, further comprising positioning a second vibration damper in the rail adjacent the probe.

15. The method of claim 13, wherein the positioning step includes positioning a damper having a mass about 4–8% of the weight of the column, carriage, rail, and probe.

* * * * *